(12) United States Patent
McGuire et al.

(10) Patent No.: US 9,926,972 B2
(45) Date of Patent: Mar. 27, 2018

(54) SPHEROIDIAL JOINT FOR COLUMN SUPPORT IN A TUNED MASS DAMPER SYSTEM

(71) Applicant: Roller Bearing Company of America, Inc., Oxford, CT (US)

(72) Inventors: Jarrod McGuire, Murrieta, CA (US); Matthew Porter, Huntington Beach, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 15/295,185

(22) Filed: Oct. 17, 2016

(65) Prior Publication Data

US 2017/0108034 A1 Apr. 20, 2017

Related U.S. Application Data

(60) Provisional application No. 62/242,672, filed on Oct. 16, 2015.

(51) Int. Cl.
*F16C 11/06* (2006.01)
*F16F 7/104* (2006.01)
(Continued)

(52) U.S. Cl.
CPC ...... *F16C 11/0652* (2013.01); *F16C 11/0604* (2013.01); *F16C 11/068* (2013.01);
(Continued)

(58) Field of Classification Search
CPC ............ E04B 1/985; E04H 9/023; F16C 11/06–11/086; F16C 23/043;
(Continued)

(56) References Cited

U.S. PATENT DOCUMENTS 3,329,472 A 7/1967 Donnellan et al.
3,728,752 A 4/1973 Andra et al.
(Continued)

FOREIGN PATENT DOCUMENTS

CN 1067700 A 1/1993
CN 201033957 Y 3/2008
(Continued)

*Primary Examiner* — Josh Skroupa
(74) *Attorney, Agent, or Firm* — Murtha Cullina LLP (57) ABSTRACT

A spheroidal joint for a tuned mass damper system includes a base having a concave seat and a lubricious liner secured thereto. The base defines a first mounting portion under the concave seat and a circumferential rim opposite the first mounting portion. The concave seat tapers radially outward to define a chamfer which terminates at a radially inner edge of the rim. The spheroidal joint includes an inner member that has a convex seat. The inner member has a second mounting portion extending from the convex seat and an indentation circumferentially extending around the inner member between the convex seat and the second mounting portion. The indentation cooperates with the chamfer for misalignment of the inner member relative to the base. The convex seat slidingly engages the lubricious liner.

12 Claims, 4 Drawing Sheets

(51) Int. Cl.
*E04H 9/02* (2006.01)
*E04B 1/98* (2006.01)

(52) U.S. Cl.
CPC ............ *F16C 11/0628* (2013.01); *E04B 1/985* (2013.01); *E04H 9/023* (2013.01); *F16C 2361/53* (2013.01); *F16F 7/104* (2013.01); *Y10T 403/32737* (2015.01)

(58) Field of Classification Search
CPC ..... F16C 27/045; F16C 2361/53; F16F 7/104; F16F 9/3207; Y10T 403/32196; Y10T 403/32204; Y10T 403/32311; Y10T 403/32614; Y10T 403/32631–403/32811
USPC .................. 403/76, 77, 90, 120, 122–144
See application file for complete search history.

(56) References Cited

U.S. PATENT DOCUMENTS

| | | | |
|---|---|---|---|
| 4,121,393 A | 10/1978 | Renault et al. | |
| 4,974,819 A | 12/1990 | Reichard et al. | |
| 5,867,951 A | 2/1999 | Yaguchi et al. | |
| 6,070,734 A | 6/2000 | Hunt et al. | |
| 6,324,795 B1 | 12/2001 | Stiles et al. | |
| 7,770,981 B2 * | 8/2010 | King ....................... | F16C 11/06 298/17.5 |
| 8,079,578 B2 * | 12/2011 | Bumgarner ............ | B23Q 1/035 269/21 |
| 8,833,745 B2 | 9/2014 | Fujita et al. | |
| 9,316,250 B2 | 4/2016 | Elterman et al. | |
| 2007/0140607 A1 | 6/2007 | Lee et al. | |
| 2010/0195942 A1 | 8/2010 | Tavecchio | |
| 2010/0232869 A1 * | 9/2010 | Ditzler ................... | F16C 11/069 403/122 |
| 2014/0026498 A1 | 1/2014 | Quaglini et al. | |
| 2015/0176674 A1 * | 6/2015 | Khan .................... | F16C 23/043 403/120 |
| 2015/0360909 A1 | 12/2015 | Smith | |

FOREIGN PATENT DOCUMENTS

| | | |
|---|---|---|
| CN | 201169745 Y | 12/2008 |
| CN | 202081377 U | 12/2011 |
| CN | 102888904 A | 1/2013 |
| CN | 203905194 U | 10/2014 |
| CN | 103147393 B | 7/2015 |
| CN | 105155708 A | 12/2015 |
| CN | 105378334 A | 3/2016 |
| CN | 104018594 B | 6/2016 |
| DE | 1901771 A1 | 11/1970 |
| DE | 2040330 A1 | 2/1971 |
| DE | 2006160 A1 | 9/1971 |
| DE | 19836763 C2 | 5/2000 |
| EP | 2227606 B1 | 4/2012 |
| GB | 1091611 | 11/1967 |
| JP | 11230254 A | 8/1999 |
| KR | 100650819 B1 | 11/2006 |
| KR | 101164982 B1 | 8/2012 |
| KR | 101410025 B1 | 6/2014 |
| KR | 101472435 B1 | 12/2014 |
| TW | I429831 B | 3/2014 |
| WO | 0037823 A1 | 6/2000 |
| WO | 2013035879 A1 | 3/2013 |
| WO | 2015136457 A1 | 9/2015 |

\* cited by examiner

SPHEROIDIAL JOINT FOR COLUMN SUPPORT IN A TUNED MASS DAMPER SYSTEM

CROSS REFERENCE TO RELATED APPLICATIONS

This patent application claims the benefit of U.S. Provisional Patent Application Ser. No. 62/242,672, filed on Oct. 16, 2015, which is hereby incorporated by reference in its entirety.

TECHNICAL FIELD

This invention relates to a spheroidal joint for a column support in a tuned mass damper system, and in particular to a spheroidal joint having a lubricious liner, the joint being used in a column support in a tuned mass damper system for a building structure.

BACKGROUND

There has been a trend to erect slender and tall high rise buildings. Tall slender buildings are, by design and nature, more flexible than shorter buildings, allowing for more lateral movement in their upper stories. A building designed to resist all of these movements would be far too large to be feasible for design and construction (e.g. a Pyramid). In order to reduce cost and dead weight, such buildings are known to incorporate light-weight materials. One downside to the use of such light-weight materials in slender buildings is that the buildings become susceptible to vibrations. For example, long ceiling spans and other long structural members can vibrate at natural frequencies and exceed acceleration limits as a result of seismic loads, wind loads and human induced loads.

Tuned Mass Damper (TMD) systems are generally employed to reduce or eliminate gross oscillations of the building structure itself by providing structural damping. To some extent, TMDs can also be used to overcome the vibrations in the buildings. The use of TMDs is preferred over increasing the structural mass because more damping can be achieved with less mass using TMDs compared to simply increasing the structural mass.

TMDs typically include a mass suspended (e.g., near the top of the building) via cables and/or columns and coupled to the building structure via one or more damping systems. To operate effectively, the mass of the TMD must be allowed to move freely. However, friction forces located at joints between components of the TMD can impede such movement thereby reducing the effectiveness of the TMD.

Prior art ball and socket bearings are small (e.g., 1 to 2 inches nominal size) and typically are either designed to handle mostly radial loading, or are designed with little misalignment capacity.

Based on the foregoing, there is a need to provide an improved TMD in which the mass is allowed to move more freely than in prior art TMDs.

SUMMARY

There is disclosed herein a spheroidal (e.g., having a spherical surface on a portion thereof) joint for a tuned mass damper system. The spheroidal joint includes a base member that defines a concave seat and a lubricious liner secured thereto. The base member defines a first mounting portion under the concave seat and a circumferential rim opposite the first mounting portion. The concave seat tapers radially outward to define a chamfer which terminates at a radially inner edge of the rim. The spheroidal joint includes an inner member that has a convex seat portion. The inner member has a second mounting portion extending from the convex seat portion and an indentation circumferentially extending around the inner member between the convex seat portion and the second mounting portion. The indentation cooperates with the chamfer to permit misalignment of the inner member relative to the base member. The convex seat portion slidingly engages the lubricious liner.

In one embodiment, the spheroidal joint includes a first adapter plate secured to the first mounting portion; and a second adapter plate secured to the second mounting portion.

There is further disclosed herein a spheroidal joint for a tuned mass damper system that includes a metallic base member having an upwardly opening concave seat that has a surface with a spherical contour. A lubricious liner is secured to the concave seat. The metallic base member has a first mounting portion located under the concave seat. The metallic base member has a circumferential rim located opposite (i.e., on an upper axial end of the metallic base member) the first mounting portion and extending radially outward from the concave seat. An end of the concave seat tapers radially outward into a chamfer (e.g., a chamfer defined by an angle of between 40 degrees and 60 degrees) which terminates at a radially inner edge of the circumferential rim. The concave seat has a first centrally located seat bottom. The metallic base member has a trapezoidal cross section of which the first mounting portion has a first outside diameter and the circumferential rim has a second outside diameter. The first outside diameter is greater than the second outside diameter. The circumferential rim extends a first height measured upwardly from the first centrally located seat bottom of the concave seat. The spheroidal joint includes a metallic inner member that has a convex seat portion having a contour complementary to the concave seat and having a second centrally located seat bottom. The metallic inner member has a second mounting portion extending from the convex seat portion and having a cylindrical side wall that has third outside diameter. The metallic inner member has an indentation circumferentially extending around the metallic inner member, between the convex seat portion and the second mounting portion. The indentation has an concave surface that extends radially into the metallic inner member a depth that is about 5 to 20 percent of the third outside diameter of the cylindrical side wall. The indentation forms a junction with the convex seat portion. The junction is located at a second height measured from the second centrally located seat bottom of the convex seat. The indentation cooperates with the chamfer of the metallic base member to accommodate misalignment (e.g., a misalignment is defined by a conical arc having an angle of between 15 degrees and 20 degrees) of the metallic inner member relative to the base member. In one embodiment, the misalignment is defined by a conical arc having an angle of between 10 degrees and 30 degrees while accommodating significant axial loading. The convex seat portion is in sliding engagement with the lubricious liner. The second height is about 80 percent to about 95 percent of the first height is 50 to 70 percent of the fourth height to confine the convex seat portion 22 of the inner member 20 in the base member 12 to restrain lateral movement of the metallic inner member relative to the base member. The lubricous liner is configured to withstand a predetermined temperature and sustained high frequency oscillatory motion of the metallic inner member relative to the metallic base member under load that heats the liner to the predetermined temperature, such that a coefficient of friction of the lubricious liner at the predetermined temperature is maintained within 10 percent of the coefficient of friction of the lubricious liner at ambient temperature.

In one embodiment, the first outside diameter of the first mounting portion is about 120 to 130 percent of the second outside diameter of the circumferential rim.

In one embodiment, the metallic base member has an overall height of about 35 percent to 45 percent of the first outside diameter of the first mounting portion.

In one embodiment, the spheroidal joint includes a first adapter plate secured to the first mounting portion; and a second adapter plate secured to the second mounting portion.

DETAILED DESCRIPTION

Figure 1:
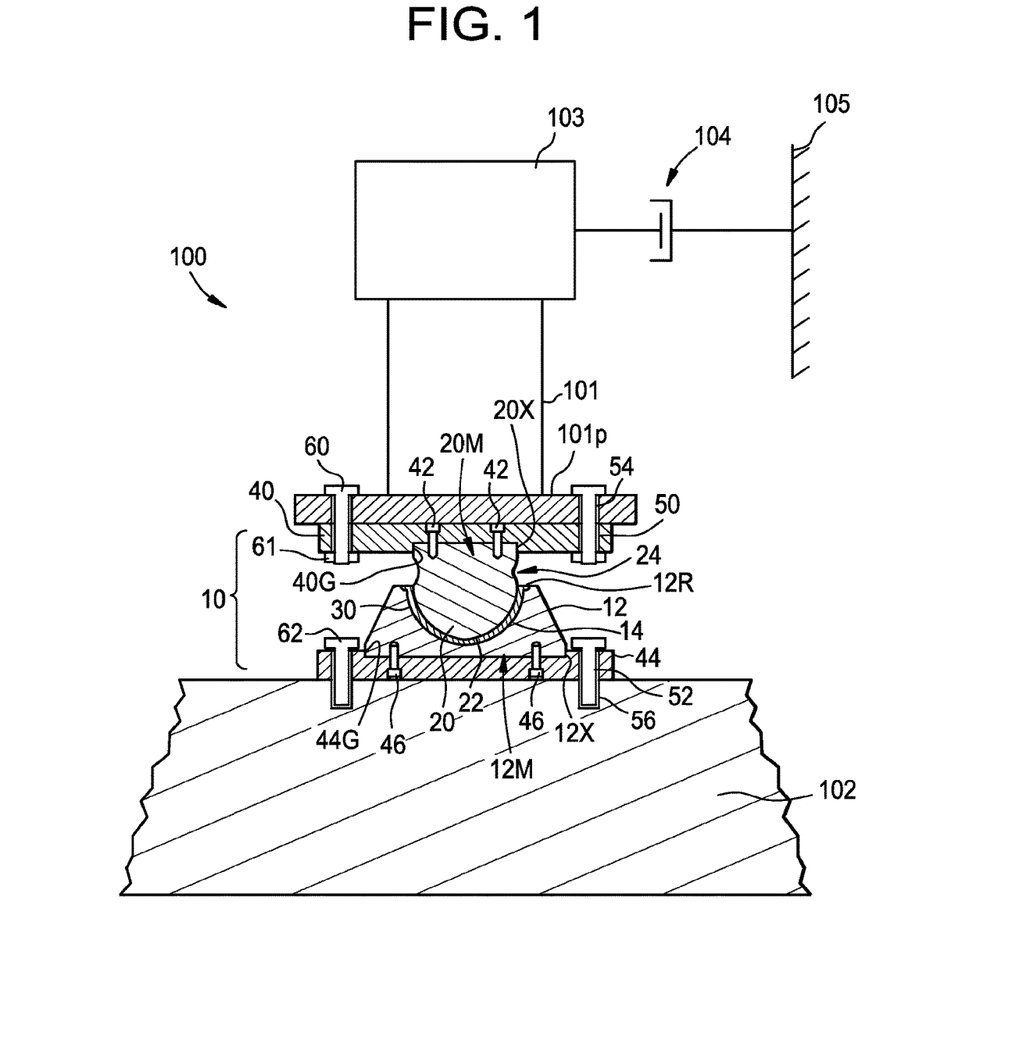
FIG. 1 is a schematic cross sectional view of a tuned mass damper system.

As shown in FIG. 1, a spheroidal joint 10 is shown installed in a tuned mass damper system 100. The tuned mass damper system 100 includes a first structural support column 101 that has a first connecting plate 101P secured thereto, for example via welding or the use of suitable fastening devices (not shown). A mass 103 is secured to an opposing end of the first column 101. The mass 103 is moveably connected to a building structure 105 via one or more damping devices 104. One end of an adapted plate 44, as described further herein, is secured to a superstructure 102 (e.g., the foundation) of the building.

Figure 2A:
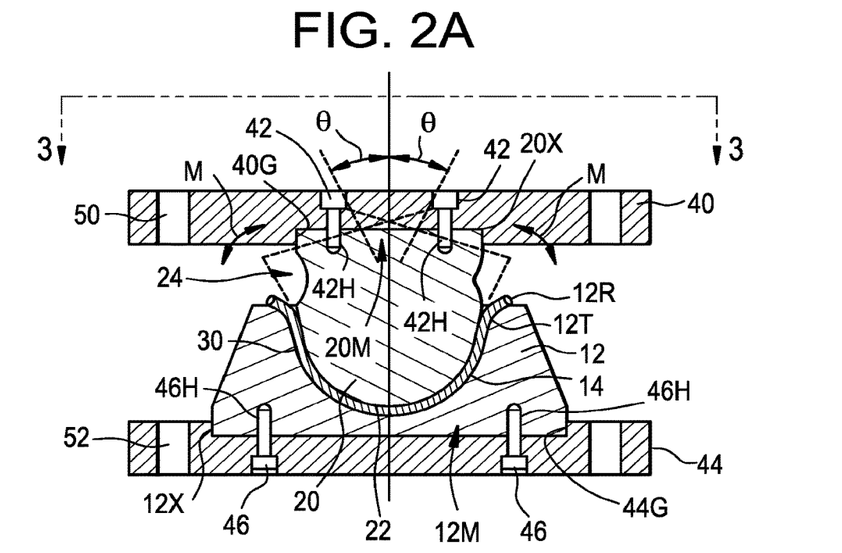
FIG. 2A is an enlarged cross sectional view of the spheroidal joint portion of FIG. 1.

As shown in FIGS. 1 and 2A, the spheroidal joint 10 includes a base member 12 defining a concave seat 14 having a spherical contour. The base member 12 defines a first mounting portion 12M under the concave seat 14. The base member 12 defines a circumferential rim 12R opposite the first mounting portion 12M and extending radially outward from the concave seat 14. The concave seat 14 tapers radially outward defining a chamfer 12T which terminates at a radially inner edge of the rim 12R. A lubricious liner 30, as described further herein, is secured to the concave seat 14 and along the chamfer 12T via a suitable bonding procedure. The base member 12 has a generally trapezoidal cross section with the first mounting portion 12M being wider than the rim 12R, for structural stability and strength. For example, in one embodiment the base 12 is about 30 percent to 40 percent wider than the rim 12R and the base has an overall height H3 (see FIG. 2B) that is about 35 percent to 45 percent of a width (i.e., outside diameter D1 in FIG. 2B) of the base 12.

As shown in FIGS. 1 and 2A, the spheroidal joint 10 includes an inner member 20 having a convex seat portion 22 having a contour complementary to the concave seat 14 (e.g., having a spherical contour). The inner member 20 has a second mounting portion 20M extending away from the convex seat 22 portion. The inner member 20 has an indentation 24 circumferentially extending around the inner member 20 between the convex seat portion 22 and the mounting portion 20M. The convex seat portion 22 is in sliding engagement with the lubricious liner 30.

The indentation 24 cooperates with the chamfer 12T to permit conical misalignment of the inner member 20 relative to the base member 12. For example, the inner member 20' is shown in dashed lines in misaligned positions in the direction of the arrows M and in a conical misalignment magnitude defined by the angles θ. In one embodiment, the conical misalignment θ is between about 15 degrees and 20 degrees. In one embodiment, the conical misalignment θ is between about 10 degrees and 30 degrees. The magnitude of the misalignment of the inner member 20 relative to the base 12 is controlled by a predetermined angle and length of the chamfer 12T and the depth and shape of the indentation 24. In one embodiment, the chamfer is defined by an angle Ø of between about 40 degrees and 60 degrees. In one embodiment, the indentation has a depth D4 of about 0.5 inches to about 1.0 inches and a radius of curvature Ri of about 6 inches to about 7.

Figure 3:
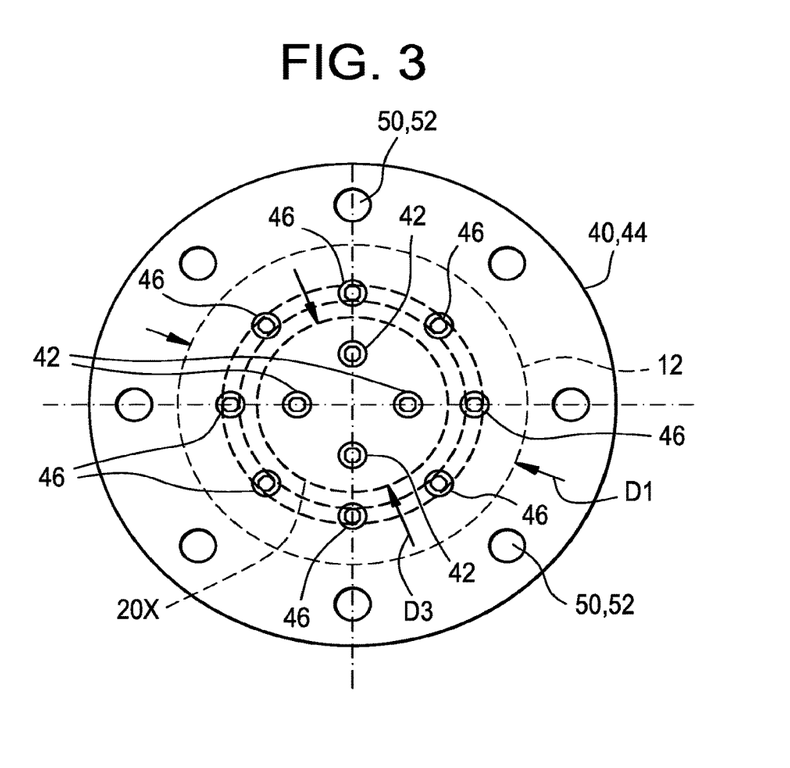
FIG. 3 is a top view of the spheroidal joint of FIG. 2 taken across line 3-3.

As shown in FIGS. 1 and 2A, the spheroidal joint 10 includes a first adapter plate 40 secured to the first mounting portion 20M. The first mounting portion 20M defines a cylindrical side wall 20X and the first adapter plate 40 has a partial bore, defined by radial side wall 40G, extending therein. The first mounting portion 20M is press fit into the bore of the first adapter plate 40 so that side wall 20X of the first mounting portion 20M frictionally engages the radial side wall 40G of the first adapter plate 40. A plurality of first fasteners 42 help secure and seat the first mounting portion 20M in the bore of the first adapter plate 40 and to mitigate rotation and misalignment of the first mounting portion 20M relative to the first adapter plate 40. As shown in FIG. 3 the first fasteners 42 are defined by four cap screws 42 extending through bores in the first adapter plate 40 and threaded into respective threaded bores 42H in the first mounting portion 20M.

While the fasteners 42 are shown and described, the present invention is not limited in this regard as other systems for securing and seating the first mounting portion 20M in the bore of the first adapter plate 40 may be employed, including but not limited to welding the first mounting portion 20M to the first adapter plate 40.

As shown in FIGS. 1 and 2A, the spheroidal joint 10 includes a second adapter plate 44 secured to the second mounting portion 12M. The second mounting portion 12M defines a cylindrical side wall 12X and the second adapter plate 44 has a partial bore, defined by radial side wall 44G, extending therein. The second mounting portion 12M is press fit into the bore of the second adapter plate 44 so that side wall 12X of the second mounting portion 12M frictionally engages the radial side wall 44G of the second adapter plate 44. A plurality of second fasteners 46 help secure and seat the second mounting portion 12M in the bore of the second adapter plate 44 and to mitigate rotation and misalignment of the second mounting portion 12M relative to the second adapter plate 44. As shown in FIG. 3 the second fasteners 46 are defined by eight cap screws 46 extending through bores in the second adapter plate 44 and threaded into respective threaded bores 46H in the second mounting portion 12M. The second fasteners 46 are arranged in a circular pattern that defines a first perimeter that is radially outward from a second perimeter defined the first fasteners 42. As shown in FIG. 3 the second adapter plate 10 has eight bores 50 extending therethrough.

While the fasteners 46 are shown and described, the present invention is not limited in this regard as other systems for securing and seating the second mounting portion 12M in the bore of the second adapter plate 44 may be employed, including but not limited to welding the welding the second mounting portion 12M to the second adapter plate 44.

Figure 2B:
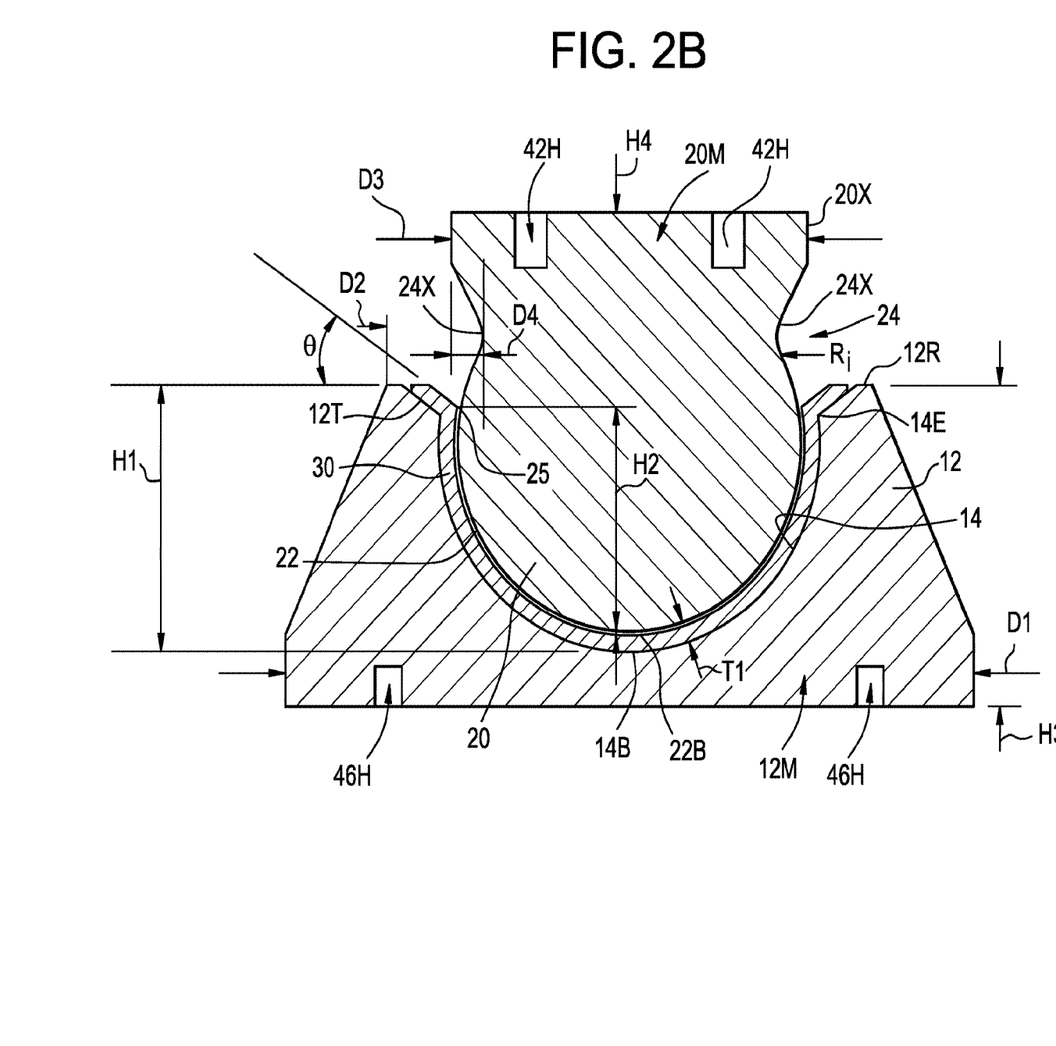
FIG. 2B is an enlarged cross sectional view of a portion of the spheroidal joint of FIG. 2A.

As shown in FIG. 2B, the spheroidal joint for a tuned mass damper system 10 includes a metallic base member 12. For example, the metallic base member 12 is manufactured from an alloy steel such as an austenitic or ferritic stainless steel, carbon steel, duplex stainless steels and precipitation hardened stainless steel. The base member 12 has the upwardly opening concave seat 14 that has a surface with a spherical contour. The lubricious liner 30 is secured to the concave seat 14. The metallic base member 12 has a first mounting portion 12M that is located under the concave seat 14. The metallic base member 12 has a circumferential rim 12R opposite (i.e., on a uppermost axial surface thereof) the first mounting portion 12M. The circumferential rim 12R extends radially outward from the concave seat 14. An end 14E of the concave seat 14 tapers radially outward into the chamfer 12T. The chamfer 12T terminates at a radially inner edge 12E of the circumferential rim 12R. The concave seat 14 has a first centrally located seat bottom 14B. The metallic base member 12 has a trapezoidal cross section of which the first mounting portion 12M has a first outside diameter D1 and the circumferential rim 12R has a second outside diameter D2. The first outside diameter D1 is greater than the second outside diameter D2. The circumferential rim 12R extends (i.e., is located at) a first height H1 measured upwardly from the first centrally located seat bottom 14B of the concave seat 14.

As shown in FIG. 2B, the spheroidal joint for a tuned mass damper system 10 includes a metallic inner member 20. For example, the metallic inner member 20 is manufactured from an alloy steel such as an austenitic or ferritic stainless steel, a carbon steel, duplex stainless steels and precipitation hardened stainless steel and suitable engineered coatings such as nickel or chrome plating. The metallic inner member 20 has the convex seat portion 22 that has a contour complementary to the concave seat 14. The convex seat portion 22 has a second centrally located seat bottom 22B. The metallic inner member 20 has the second mounting portion 20M extending from the convex seat portion 22. The second mounting portion 20M has the cylindrical side wall 20X that has third outside diameter D3. The metallic inner member 20 has the indentation 24 circumferentially extending around the metallic inner member 20 between the convex seat portion 22 and the second mounting portion 20M. The indentation 24 is formed by a concave surface 24X that has a radius of curvature Ri. In one embodiment, the radius of curvature Ri is about 5 percent to about 20 percent of the third diameter D3. The concave surface 24X of the indentation 24 extends radially into the metallic inner member 20 a depth D4 that is about 5 to 20 percent of the third outside diameter D3 of the cylindrical side wall 20X to accommodate misalignment. The indentation 24 forms a junction 25 with the convex seat portion 22. The junction 25 is located at a second height H2 measured from the second centrally located seat bottom 22B of the convex seat portion 22. The indentation 24 cooperates with the chamfer 12T of the metallic base member 12 to accommodate misalignment of the metallic inner member 20 relative to the metallic base member 12. The second height H2 is about 80 percent to about 95 percent of the first height H1. The third height H3 is about 50 to 70 percent of the fourth height H4 to confine the convex seat portion 22 of the inner member 20 in the base member 12 (e.g., metallic inner member 20 is 50 to 70 percent confined within the metallic base member 12) to restrain lateral movement (e.g., left to right movement in FIG. 2B) of the metallic inner member 20 relative to the base member 12. The lubricous liner is configured to withstand a predetermined temperature and sustained high frequency oscillatory motion of the metallic inner member relative to the metallic base member under load that heats the liner to the predetermined temperature, such that a coefficient of friction of the lubricious liner at the predetermined temperature is maintained within 10 percent of the coefficient of friction of the lubricious liner at ambient temperature (e.g., 70 to 100 degrees Fahrenheit).

The metallic base member 12 has an overall height H3 that is about 35 percent to 45 percent of the first outside diameter D1 of the first mounting portion 12M.

In one embodiment, the first outside diameter D1 of the first mounting portion 12M is about 120 to 130 percent of the second outside diameter D2 of the circumferential rim.

In one embodiment, the first outside diameter D1 of the first mounting portion 12M is about 10 inches to about 12 inches; the second outside diameter D2 of the circumferential rim 12M is about 7 inches to about 9 inches; the third outside diameter D3 of the cylindrical side wall 20X is about 6 inches to about 8 inches; the liner 30 has a thickness T1 of about 0.02 inches to about 0.08 inches; the first height H1 is about 3 inches to about 4 inches; the second height H2 is about 3 inches to about 4 inches; the overall height H3 of the base member 12 is about 4 inches to about 6 inches; the overall height H4 of the inner member 20 is about 6 inches to about 8 inches; the radius of curvature Ri of the indentation 24 is about 6 inches to about 7 inches and the indentation has a depth D4 of about 0.5 inches to about 1.0 inches.

As shown in FIG. 2B, the convex seat portion 22 is in sliding engagement with the lubricious liner 30. The lubricous liner 30 is configured to withstand a predetermined temperature of at up to 400 degrees Fahrenheit and sustained high frequency oscillatory motion of the metallic inner member 20 relative to the metallic base member 12 under load. The sustained high frequency oscillatory motion heats the liner to the predetermined temperature. The lubricious liner 30 has a coefficient of friction at the predetermined temperature that is maintained within 10 percent of the coefficient of friction of the lubricious liner at ambient temperature (e.g., 70 to 100 degrees Fahrenheit).

In some embodiments, the first connecting plate 101P has eight bores 54 (FIG. 1 shows two of the bores 54) extending therethrough; and a second connecting plate 102P (not shown) has eight bores 56 extending therethrough (FIG. 1 shows two of the bores 56). The bores 54 and 56 are concentric with one another and are arranged in a circular configuration that is located radially outside of the fasteners 46. While the fasteners 46 are shown and described, the present invention is not limited in this regard as other systems for securing and seating the mounting portion in the bore of the first adapter plate 40 may be employed, including but not limited to welding the mounting portion 20M to the first adapter plate 40.

As shown in FIG. 1, the first connecting plate 101P is secured to the first adapter plate 40 via eight bolts 60 and nuts 61 that extend through respective ones of the bores 50 and 54 of the first adapter plate 40 and the first connecting plate 101P, respectively. The second adapter plate 44 is secured directly to the superstructure 102 via eight bolts 62 that extend through respective ones of the bores 52 and 56 of the second adapter plate 44 and the superstructure 102, respectively. While the bolts 60 and 62 and nuts 61 are shown and described, the present invention is not limited in this regard as other fasteners and fastener and welding configurations may be employed. For example, threaded rod with nuts on both ends thereof or reversing the direction of the bolts 60. While the second adapter plate 44 is shown and described as being secured directly to the superstructure 102, the present invention is not limited in this regard as an intermediate column and/or plate may be interposed between the super structure 102 and the second adapter plate 44.

Figure 4:
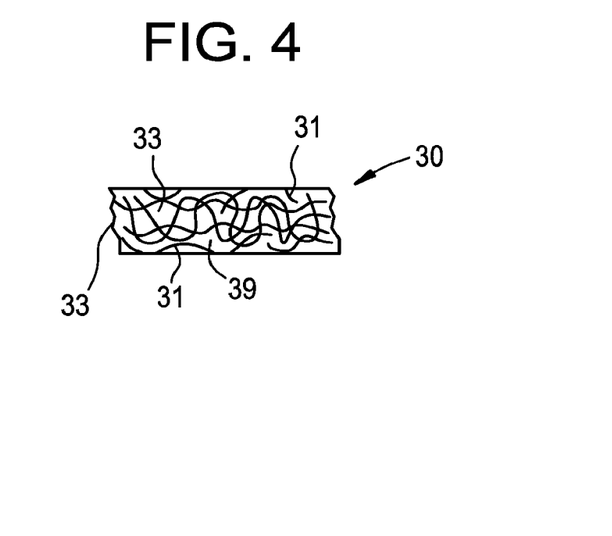
FIG. 4 is an enlarged view of a portion of the self-lubricating liner of the spheroidal joint of FIG. 3.

As shown in FIG. 4, the lubricious liner 30 includes a plurality of lubricating fibers 31 in a support system. In one embodiment, the support system defines a plurality of support fibers 33 and a resin system 39 infused between and encapsulating the support fibers 33 and the lubricating fibers 31. In one embodiment, the plurality of lubricating fibers 31 are manufactured from a polytetrafluoroethylene (PTFE) material, a nylon, and/or a graphite. In one embodiment, the plurality of support fibers 33 are manufactured from fiberglass, polyethylene terephthalate (sometimes written poly (ethylene terephthalate)), commonly abbreviated PET, PETE (Dacron®)), polyester, cotton, a meta-aramid material (e.g., Nomex®), and/or a para-aramid synthetic material (e.g., Kevlar®). In one embodiment, the resin system 39 includes polyester, epoxy, phenolic, urethane, polyimide and/or polyamide. In one embodiment, the support system includes a filler in a composite resin system including polyester, epoxy, phenolic, urethane, polyimide and/or polyamide. In one embodiment, the filler comprises fiberglass, graphite, bronze, molybdenum disulfide and/or carbon fiber.

Figure 5:
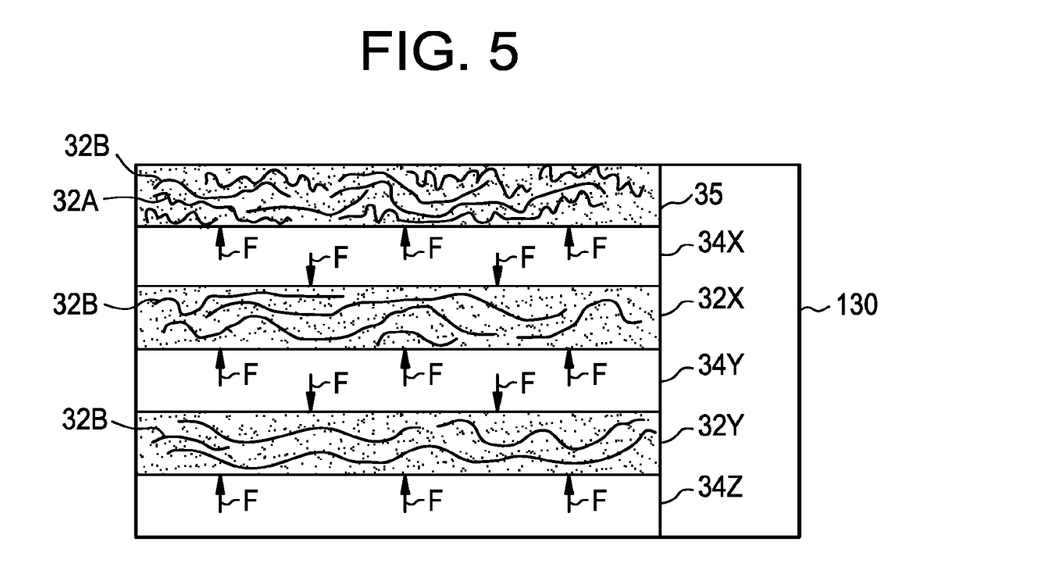
FIG. 5 is an enlarged view of a portion of another the self-lubricating liner of the spheroidal joint of FIG. 3.

As shown in FIG. 5, another embodiment of a lubricious liner is designated by the numeral 130. The lubricious liner 130 includes a first fiber (e.g., fabric) layer 35, a second fiber (e.g., fabric) layer 32X and a third fiber (e.g., fabric) layer 32Y. The first fiber layer 35 is made from a blend of self-lubricating fibers 32A and support fibers 32B. The second fiber layer 32X and the third fiber layer 32Y are made from support fibers 32B. In one embodiment, the plurality of self-lubricating fibers 32A are polytetrafluoroethylene (PTFE). In one embodiment, the plurality of self-lubricating fibers 32A includes graphite fibers. In one embodiment, the plurality of support fibers 32B are fiberglass fibers, polyethylene terephthalate (Dacron®) fibers, polyester fibers, cotton fibers, meta-aramid (Nomex®) fibers and/or a para-aramid (Kevlar®) fibers.

The lubricious liner 130 includes a first matrix layer (i.e., made from a resin system) 34X, a second matrix layer (i.e., made from a resin system) 34Y and a third matrix layer (i.e., made from a resin system) 34Z. In one embodiment, the resin system of the first matrix layer 34X, the second matrix layer 34Y, and the third matrix layer 34Z includes a polyester, an epoxy, a phenolic, a urethane, a polyimide and/or a polyamide.

In one embodiment, lubricious liner 30 includes a filler disposed therein, such as but not limited to fiberglass, graphite, bronze, molybdenum disulfide and carbon fiber. In one embodiment, the lubricious liner 30 is comprised of a PTFE matrix and includes the filler disposed therein.

The first matrix layer 34X is forced into the first fiber layer 35 as indicated by the arrows F so that the first matrix layer 34X encapsulates the first fiber layer 35 and the resin system of the first matrix layer 34X is infused into the first fiber layer 35 between and around the self-lubricating fibers 32A and the support fibers 32B.

The first matrix layer 34X and the second matrix layer 34Y are forced into the second fiber layer 32X as indicated by the arrows F so that the first matrix layer 34X and the second matrix layer 34Y encapsulate the second fiber layer 32X and the resin system of the first matrix layer 34X and the second matrix layer 34Y are infused into the second fiber layer 32X between and around the support fibers 32B.

The second matrix layer 34Y and the third matrix layer 34Z are forced into the third fiber layer 32Y as indicated by the arrows F so that the second matrix layer 34Y and the third matrix layer 34Z encapsulate the third fiber layer 32X and the resin system of the second matrix layer 34Y and the third matrix layer 34Z are infused into the third fiber layer 32Y between and around the support fibers 32B.

The lubricious liners 30 and 130 are configured to withstand frictional heat generated from sustained high frequency oscillatory motion of the inner member 20 relative to the base member 12 under load.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A spheroidal joint for a tuned mass damper system, the spheroidal joint comprising:

a metallic base member having an upwardly opening concave seat having a surface with a spherical contour, a lubricious liner secured to the concave seat, the metallic base member having a first mounting portion under the concave seat, the metallic base member having a circumferential rim opposite the first mounting portion and extending radially outward from the concave seat, an end of the concave seat tapers radially outward into a chamfer which terminates at a radially inner edge of the circumferential rim, the concave seat having a first centrally located seat bottom, the metallic base member having a trapezoidal cross section of which the first mounting portion has a first outside diameter and the circumferential rim has a second outside diameter, the first outside diameter being greater than the second outside diameter, the circumferential rim extending a first height measured upwardly from the first centrally located seat bottom of the concave seat; and a metallic inner member having a convex seat portion having a contour complementary to the concave seat and having a second centrally located seat bottom, the metallic inner member having a second mounting portion extending from the convex seat portion and having a cylindrical side wall that has third outside diameter, the metallic inner member having an indentation circumferentially extending around the metallic inner member between the convex seat portion and the second mounting portion, the indentation having an concave surface that extends radially into the metallic inner member, the indentation forming a junction with the convex seat portion, the junction being located at a second height measured from the second centrally located seat bottom of the convex seat, the indentation cooperating with the chamfer of the metallic base member to accommodate misalignment of the metallic inner member relative to the base member, and the convex seat portion being in sliding engagement with the lubricious liner;

the metallic inner member being 50 to 70 percent confined within the metallic base member to restrain lateral movement of the metallic inner member relative to the base member; and the lubricous liner is configured to withstand a predetermined temperature of at least 400 degrees Fahrenheit and sustained oscillatory motion of the metallic inner member relative to the metallic base member under load that heats the liner to the predetermined temperature, such that a coefficient of friction of the lubricious liner at the predetermined temperature is maintained within 10 percent of the coefficient of friction of the lubricious liner at ambient temperature.

2. The spheroid joint of claim 1, wherein the misalignment is defined by a conical arc having an angle of between 10 degrees and 30 degrees.

3. The spheroid joint of claim 1, wherein the chamfer is defined by an angle of between 40 degrees and 60 degrees.

4. The spheroid joint of claim 1, wherein first outside diameter of the first mounting portion is about 120 to 130 percent of the second outside diameter of the circumferential rim.

5. The spheroid joint of claim 1, wherein the metallic base member has an overall height of about 35 percent to 45 percent of the first outside diameter of the first mounting portion.

6. The spheroid joint of claim 1, wherein the lubricious liner comprises a plurality of lubricating fibers in a support system.

7. The spheroid joint of claim of claim 6, wherein the support system comprises a plurality of support fibers and a resin infused between the support fibers and the lubricating fibers.

8. The spheroid joint of claim of claim 7, wherein the plurality of support fibers comprises at least one of fiberglass, polyethylene terephthalate, polyester, cotton, a meta-aramid material and a para-aramid synthetic material.

9. The spheroid joint of claim of claim 7, wherein the resin system comprises at least one of polyester, epoxy, phenolic, urethane, polyimide and polyamide.

10. The spheroid joint of claim of claim 6 wherein the plurality of lubricating fibers comprises polytetrafluoroethylene.

11. The spheroid joint of claim 6, wherein the support system comprises a filler in a composite resin system comprising at least one of polyester, epoxy, phenolic, urethane, polyimide and polyamide.

12. The spheroid joint of claim 6, wherein the filler comprises at least one of fiberglass, graphite, bronze, molybdenum disulfide and carbon fiber.

* * * * *